Oct. 6, 1942.  J. O. PARR, JR  2,298,020
SEISMIC SURVEYING
Filed April 5, 1940
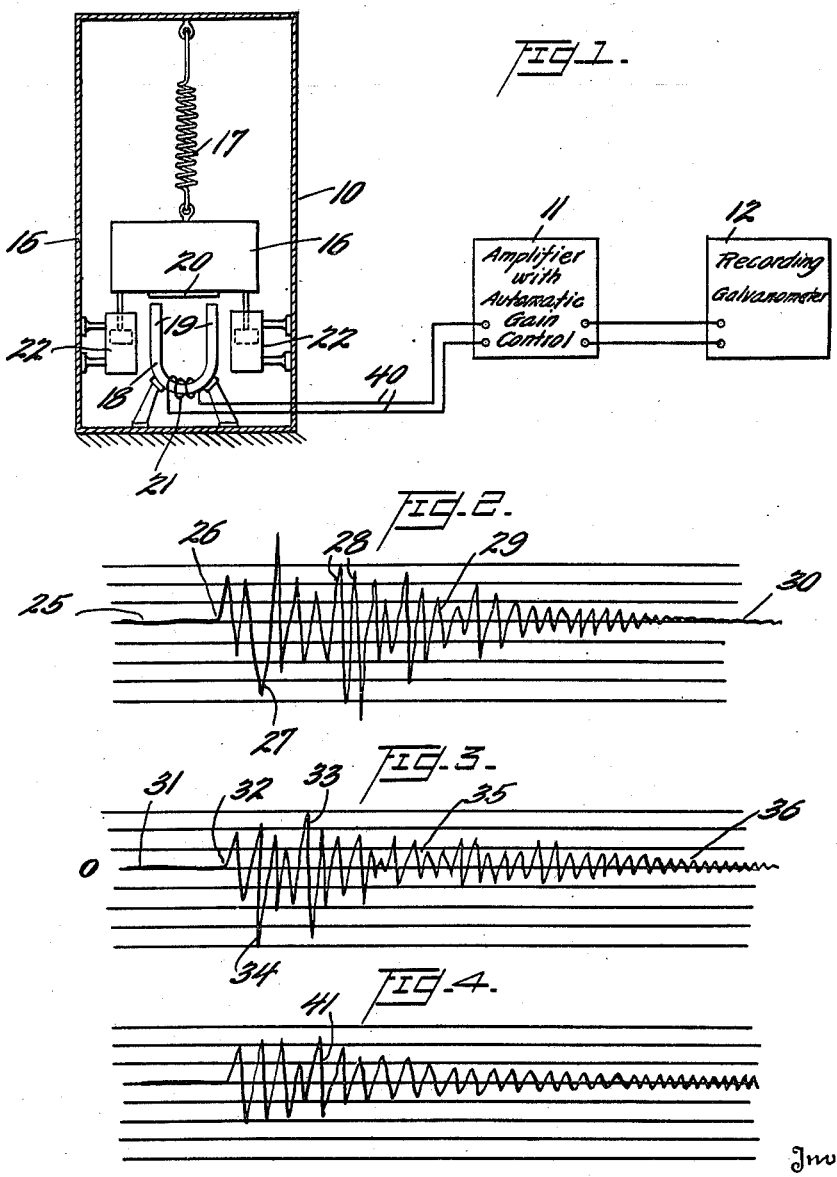

Patented Oct. 6, 1942

2,298,020

UNITED STATES PATENT OFFICE 2,298,020

SEISMIC SURVEYING

Josephus O. Parr, Jr., San Antonio, Tex., assignor to Olive S. Petty, San Antonio, Tex.

Application April 5, 1940, Serial No. 328,092

8 Claims. (Cl. 177—352)

This invention relates to methods of and apparatus for conducting seismic surveys for use in connection with geophysical prospecting and it relates more particularly to the apparatus and methods for recording the times of arrival of seismic wave-trains at any particular station.

It is a general object of the present invention to provide novel and improved apparatus for and methods of recording the arrival times of seismic wave-trains which extend over a period of several seconds and exist during that time at various intensities or amplitudes, the ratio of the highest to the lowest amplitude being relatively large.

More particularly it is an object of the invention to provide means for reducing to substantially a uniform general level the pulsating electrical signal output of the recording equipment.

An important feature of the invention consists in the construction of a seismometer or electro-mechanical transducer capable of converting seismic wave energy into electric waves which exactly indicate the timing of the seismic waves but which is effective to promote a general levelling of the output amplitude of the electric waves representative of individual seismic waves whereby the records made from the electric waves will be more uniform in size and can be kept within reasonable bounds.

An important object of the invention consists in the construction and combination of an electro-mechanical transducer and an amplifier for the output thereof, each of which parts contributes to changing the over-all output amplitude to a substantially uniform level in spite of tremendous variations in the amplitude level of the generating seismic waves.

A further object of the invention consists in the provision of a seismometer, the output signal from which is materially and instantly reduced in relative intensity upon the receipt of a seismic wave having greater than a predetermined threshold amplitude and in which subsequent seismic shocks serve to produce a signal gradually increasing in intensity in relation to the amplitude of the generating wave.

Another important feature of the invention consists in the construction of a seismometer in which the natural resonant period of the inertia reactor is many times greater than that of the energizing seismic waves.

A further important feature of the invention consists in the arrangement of a seismometer of the transducer type in which the inertia reactor is suspended from the case in such a manner that the natural period thereof is substantially as long as the time during which the train of waves, desired to be recorded, exists, and in which means is provided to limit the excursion of the reactor in respect to the casing in one direction, only, to less than the amplitude of the larger waves in the said train.

Other and further features and objects of the invention will be more apparent to those skilled in the art upon a consideration of the accompanying drawing and following specification wherein is disclosed a single exemplary embodiment of the invention with the understanding that such changes may be made therein as fall within the scope of the appended claims without departing from the spirit thereof.

In the drawing:

Figure 1 is a schematic and diagrammatic illustration of apparatus used for recording the arrival of seismic waves at any particular station resulting from artificial seisms at a remote point;

Figure 2 is a representative recorder trace of a seismic wave-train in which the chart amplitudes are substantially representative of the wave amplitudes, as a result of not using compensation;

Figure 3 is a representative chart of the output signal from a seismometer, constructed according to the present invention, amplified with uniform gain throughout; and Figure 4 is a representative chart of the output signal from a seismometer constructed according to the present invention when combined with an amplifier having automatic gain control.

Seismic surveys which are made for the purpose of geophysical prospecting are now largely carried out by measuring the travel times of an artificially generated seismic wave-train as reflected from various sub-surface discontinuities. The more or less conventional method of carrying out such surveys comprises the firing of a charge of high explosive, such as dynamite, at the bottom of a water-filled drill hole sufficiently deep to locate the explosive at a "shot point" beneath the weathered layer of the earth and in the more solid soil thereof, and receiving the reflected waves at a plurality of seismometers spaced in a line, or other formation, near the surface of the earth at varying distances from the shot point. It is customary to have all of the seismometers connected to a single recording galvanometer which then provides for each seismometer a record trace on a single sheet of photographic paper.

In the so-called "reflection" type of shooting, it is customary, in most cases, to obtain a record lasting several seconds as the result of seismic waves set up by the single explosion. The first portion of the wave-train is often of high intensity representative of so-called surface waves which usually reach the seismometers first and with much greater intensity because of their shorter paths of travel than the more desirable reflected waves which sometimes penetrate to great depths before being reflected from interfaces and travelling back to the seismometers. Nevertheless it is important to known the exact instant of arrival of the more intense waves. Also it is important to know the exact instant of arrival of the reflected waves and this is sometimes masked by the surface waves of greater amplitude. Toward the end of the recording, when reflections from great depths are arriving, the intensities are sometimes so reduced that they are difficult to read on the chart.

It has been found that in average cases there is an amplitude ratio between the strongest and the weakest waves received of approximately 600 to 1. The conventional seismometer most often used in reflection shooting is of the electromechanical transducer type producing alternating or pulsating electric waves comparable in amplitude to those of the seismic waves producing them. To record such electric waves in a usable form is difficult because of their great variation in intensity. If the apparatus is adjusted to keep the waves of larger intensity within a reasonable size on the chart, then the later arriving and more attenuated waves are so poorly recorded that they are practically useless for computation purposes. If an effort is made to increase the amplitude of these later waves, then the earlier ones become so large they cannot be kept on a reasonable sized chart. They also endanger the apparatus, often breaking the delicate strings of the galvanometer.

Heretofore efforts have been made to compensate for this great discrepancy in amplitudes by passing the output of each seismometer through a thermionic amplifier before feeding it to the recording galvanometer, and providing some form of gain control, either manual or automatic, in this amplifier in an effort to level out the response so that the record trace is more nearly uniform in amplitude. The time over which the signals arrive is so short and the changes in intensity are so rapid that manual control is exceedingly difficult and not very satisfactory. Automatic control has not proven entirely satisfactory although it does render superior and usable results. The great difficulty here is that the gain control is usually effected by a variation in the voltage applied to the grid of one or more of the amplifier tubes. Suitable tubes are not available which will accept the necessary variation in grid bias to compensate for signal amplitude ratios as great as 600 to 1.

In accordance with the present invention it is proposed to construct a seismometer whose response is not linear but which favors waves of small amplitude as against those of large amplitude so as to produce an output in which the amplitude ratio between the strong and weak signals is very much less than that existing in the seismic waves causing the signals.

As another feature of the invention it is proposed to provide in the seismometer a partial control of the volume of the output and to complete this control by automatic gain compensation in the amplifier, it being essential to use an amplifier, in most cases, to provide sufficient intensity of output for satisfactory operation of the recorder. By taking care of a portion of the compensation in the seismometer it is much easier to design and construct an amplifier having satisfactory automatic gain control.

Referring now to the drawing for a better understanding of the invention there is shown in Figure 1 a seismometer 10, the specific construction of which forms no essential part of the present invention. It may react to provide electric signals in accordance with any of the various types of seismometers already well-known. The output from the same is fed to the amplifier 11 provided with automatic gain control such for instance as disclosed in the copending application of O. S. Petty, Serial No. 319,137, filed February 15, 1940. The output from the amplifier is fed to the recording galvanometer 12 or more or less conventional construction containing the necessary sensitive movable element responsive to the amplified current and the photographic means for recording the movement of this element on a timed tape.

The seismometer 10 is shown only schematically and in the present case comprises an electromechanical transducer adapted to generate electric waves in response to relative movement between the case or housing 15 thereof and the so-called steady-mass or inertia reactor 16 which is shown as suspended from the case by a suitable suspension means 17 having restoring force for returning the reactor to its reposed position after any excursion thereof relative to the case. A permanent magnet 18 is rigidly supported from the case and its poles 19 confront an armature 20 secured to the inertia reactor. A suitable coil 21 surrounding the magnet, as shown, or conversely the armature is adapted to generate voltages responsive to changes of flux density linking the same. Such changes in flux density result from varying the spacing or air gaps between the poles of the magnet and its armature and this is done by relative movement between the casing and the inertia reactor. Suitable damping means, schematically shown as dashs pots 22, prevent persistence of motion between the relatively movable parts.

The apparatus just described is more or less conventional but in order to have the seismometer act as described previously, it is essential that the natural frequency of the sprung mass be very low. This can be obtained in several ways—first, by using a large mass and a small restoring force or second, by providing a balance of forces either mechanical or magnetic, for instance in the manner described in the copending application of O. S. Petty, Serial No. 318,739, filed February 13, 1940.

Illustratively the inertia reactor 16 is shown as having a large mass and the spring suspending the same as having but little restoring force. It is easily possible to provide a seismometer having a period of several seconds, as is well-known in earthquake recording. This is of the order of the period of time during which the seismic wave-train, which it is desired to record, exists. As set forth in the above mentioned application, the desired seismic waves are in a band extending approximately from 20 to 70 cycles per second. A further important feature in the construction of the seismometer is to have the distance between the poles 19 and the armature 20 extremely small so that the seismometer is very sensitive and has a high voltage response for relatively small seismic shocks. It will be appreciated that the smaller the air gaps, the greater the voltage generated for the same change in size of the air gap. However, when a large seismic wave moves the case, upward in the present instance, the gaps are completely closed and the striking of the poles against the armature forces the steady-mass or inertia reactor upwardly and it continues to move in this direction with a time constant as determined by the restoring force and its own mass. Some means must be provided to prevent sticking of the poles to the armature and this can be any of the well-known expedients such as the use of non-magnetic bumpers of any sort.

The striking of the poles produces a considerable gap and immediately reduces the sensitivity of the seismometer. The poles, however, gradually approach each other under the action of the restoring means and the sensitivity gradually increases until it reaches a maximum value when the poles are at substantially the original spacing. This operation requires, however, an interval equivalent to the period of the inertia reactor.

Consider now the action of a seismic wave such as represented in Figure 2. This drawing is actually a representative recording of the output of a non-compensated seismometer, but it can be considered as representative of the intensity of the seismic waves at the seismometer. The level portion 25 may represent a relatively steady condition of the earth, and the sudden inflection 26 followed by a short excursion the arrival of the first wave. This is followed then by a plurality of waves of large amplitude such as 27 and 28 which exist until approximately at 29, when the size is materially reduced upon the passing of the surface waves and the arrival of reflected waves. These reflected waves continue with reduced intensity until they level out almost to zero as shown at 30. The reaction of this on the improved seismometer will be somewhat as shown in Figure 3 with the level output equivalent to zero at 31, the sharp inflection at 32 produced by the first wave arriving, and then the reduced intensity 33 of the more powerful waves. The first inflection 32 takes place when the pole tips of the seismometer are very close together and provides a sharp break. When the pole tips strike there may be a single large deflection as at 34 and then since the poles are now widely separated, even the large excursions caused by the surface waves produce only the smaller signals 33 followed by the even smaller signals 35 of the reflected waves. The inertia reactor, however, is now returning toward the poles, as previously explained, and the device is becoming more and more sensitive so that the subsequent waves even toward the end of the train as shown at 36 are of greater intensity and the general level of the whole chart is much more nearly uniform than in the case of Figure 2.

By applying the output from the coil 21 by means of conductors 40 to the amplifier 11 which is provided with automatic gain control, a further levelling of the output provided to the galvanometer is effected so that the over-all result is somewhat like that shown in the curve 41 of Figure 4 where all of the waves are of adequate size for careful observation and yet none are so large as to endanger the galvanometer or to extend off of the chart.

It will be understood that the type of seismometer is unimportant, it being only essential that it have the characteristics of a long period, of the order of that over which the wave-train exists, that the pole-pieces or other means are sufficiently close to provide high sensitivity and striking upon the occurrence of the seismic wave of large intensity and that the sensitivity be rapidly decreased as the pole spacing increases.

Having thus described the invention, what is claimed as new and desired to be secured by Letters Patent is:

1. A seismometer of the electro-mechanical transducer type for use in geophysical prospecting to pick up seismic waves in the band extending from 20 to 70 cycles per second originating from a distant shot, and in which the sensitivity is dependent upon and varies with the closeness of spacing of the generating elements, in combination, a casing carrying one of said elements, a steady mass carrying the second of said elements, means suspending said mass from said casing and providing a restoring force therefor, said means and mass being adjusted to provide a period for the mass of the order of that over which the shot generated seismic wave train exists from any one single shot.

2. A seismometer as defined in claim 1 in which the repose spacing of the said generating elements is so close that first arriving feeble seisms provide usable signal output of an order higher than that from the last waves to be received.

3. In a seismometer of the type providing a variable electrical output indicative of the arrival but not the intensity of seismic waves resulting from an explosion shot, the combination of a casing, a steady-mass mounted for movement relative to said casing, restoring means adapted to maintain said mass in a predetermined repose position, said mass being arranged for oscillation at a normal period of the order of that over which the shot generated seismic wave train exists as a result of one shot, elements on said casing and steady-mass cooperating upon relative movement to provide said variable output, said repose position restricting free relative movement in one direction to less than that imparted by early arriving seisms whereby said elements are forced widely apart by contact so caused to operate at reduced but continuously increasing intensity during said normal period as the mass returns toward repose position at its normal rate.

4. A seismometer of the electro-mechanical transducer type having in combination, a casing, an inertia reactor suspended from said casing for movement relative thereto with a period of the order of fifty times that of the operating seisms, said casing and reactor supporting cooperating generating elements operative upon relative movement to generate a variable signal voltage, means limiting the range of relative movement of said casing and reactor in one direction only to less than the motion imparted to the casing by certain seisms, said generating elements being so constructed as to reduce the output signal voltage generated on relative movement in proportion to the average displacement of the reactor from repose position in a direction opposite to the range limited one.

5. Apparatus for converting a seismic wave-train into electric signals and amplifying said signals for recording, wherein said train of waves extends over a period of several seconds and the first part of the train has a general amplitude level several times greater than the remainder, comprising in combination, a transducer adapted to convert said seismic waves to electric waves, said transducer being constructed to have a normal period of the order of the length of the wave train to be converted while remaining responsive to the seismic waves, means dependent on said period to reduce the ratio of high to low level amplitude output and an amplifier for said output having automatic gain control adapted to further reduce said ratio to such an extent that the over-all output has a generally uniform level.

6. Apparatus for converting a train of seismic waves into electric signals representative of the character and timing of said waves and for amplifying said signals for recording, wherein said train of waves extends over a period of several seconds, the first part of the train has a general amplitude level a number of times greater than the remainder, and in which the level of the remainder gradually decreases, comprising in combination, a transducer adapted to convert a part of the energy of said seismic waves into electric waves, means providing a period for said transducer of the order of said train extent while remaining responsive to the seismic waves, means in said transducer responsive to the first received high level wave in said train to substantially reduce the response thereof, means under the control of said period providing means to gradually increase the response after a decrease thereof, an amplifier for said electric waves and an automatic gain control therefor, said gain control being timed to operate in conformity with said response increase to provide a final output of substantially uniform level.

7. The combination with a seismic wave detector having an electric wave output variable simultaneously with and by the arrival of seisms from an explosive shot, the whole readily detectable train of which exists for a period of the order of two seconds, of an amplifier for raising the general level of said output to an amount suitable for recording, said detector being constructed to have high initial sensitivity, means incorporated in said detector and sensitive to large amplitude seisms to reduce the sensitivity, further means to gradually restore the sensitivity over the said period, said amplifier having means to decrease the gain for large amplitude signals and to increase it for small amplitude signals whereby the over-all result is a substantially uniform level of output for the duration of the train.

8. A seismic transducer for converting a seismic wave train into electric signals of corresponding timing, wherein the said wave train is composed of fifty to several hundred cycles, the first one or two of which are small in amplitude, the succeeding few cycles being of the order of fifty to six hundred times as large, and the remaining cycles gradually decreasing in amplitude until near the end of the train they are of the same order as the initial waves, said transducer comprising relatively movable parts for generating said signals and being so constructed and arranged as to have high initial sensitivity, the natural period of relative movement of said parts being somewhat longer than the duration of the group of seisms of high amplitude, means responsive to at least the first of said high amplitude cycles to greatly reduce the sensitivity, and means to gradually return the sensitivity to maximum over the natural period of the transducer.

JOSEPHUS O. PARR, Jr.